March 18, 1924.   E. A. SPERRY   1,487,282

FIRE CONTROL SYSTEM

Filed Jan. 3, 1920   3 Sheets-Sheet 1

INVENTOR
ELMER A. SPERRY.
BY
Herbert H. Thompson
HIS ATTORNEY

March 18, 1924.

E. A. SPERRY

FIRE CONTROL SYSTEM

Filed Jan. 3, 1920

INVENTOR
ELMER A. SPERRY.
BY
Herbert H. Thompson
HIS ATTORNEY

March 18, 1924.

E. A. SPERRY 1,487,282

FIRE CONTROL SYSTEM

Filed Jan. 3, 1920    3 Sheets-Sheet 3

INVENTOR
ELMER A. SPERRY.
BY
Herbert H. Thompson
HIS ATTORNEY

Patented Mar. 18, 1924.

1,487,282

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

FIRE-CONTROL SYSTEM.

Application filed January 3, 1920. Serial No. 349,345.

*To all whom it may concern:*

Be it known that I, ELMER A. SPERRY, a citizen of the United States of America, residing at 1505 Albemarle Road, Brooklyn, in the county of Kings and State of New York, have invented certain new and useful Improvements in Fire-Control Systems, of which the following is a specification.

This invention relates to a fire control system and is concerned chiefly with a system for determining the range and position in azimuth of a target with relation to a distant point from which the target may be invisible. By means of my invention such point is provided with the bearing or azimuth position of the target and with sufficient data for readily computing the range. I have illustrated my invention in connection with a ship located at a considerable distance from the target, but it is evident that the application of such invention is not limited to ships and that it can be used to supply the above mentioned information to points on land as well as at sea. My invention is carried out by means of an aircraft, such as an aeroplane flying preferably between the said point and target, at such a height that both the point and target can be seen, and provided with special instruments for obtaining and checking the desired data.

Referring now to the drawings wherein I have shown what I now consider to be the preferred form of my invention.

Figure 1:
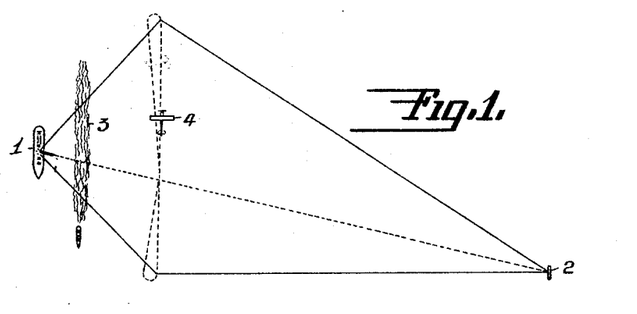
Fig. 1 is a diagrammatic plan view illustrating my fire control system.
Figures 2, 3, 10:
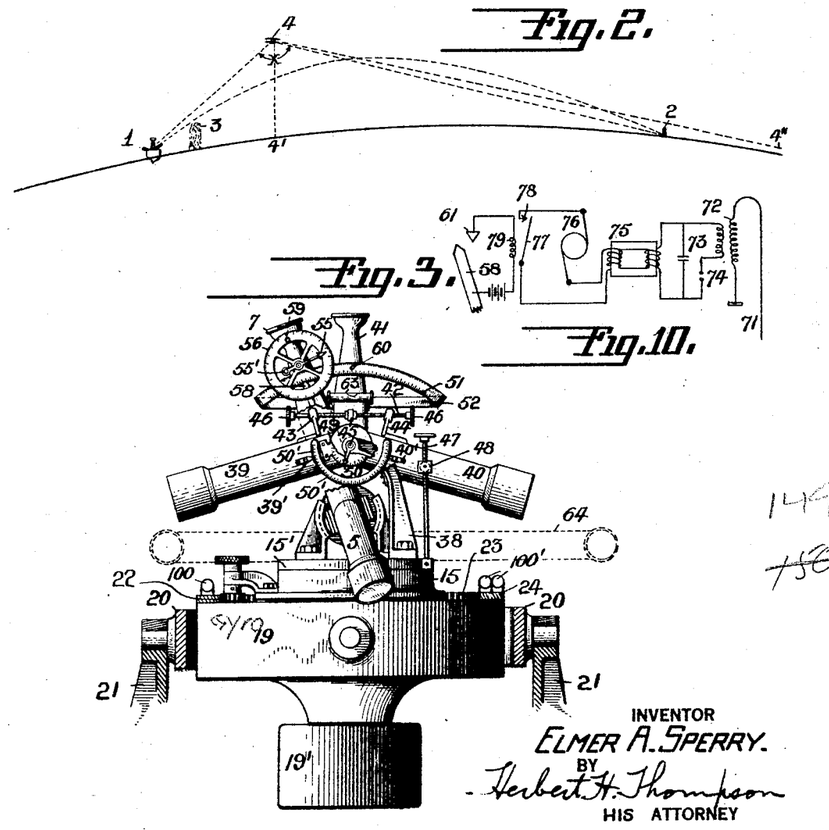
Fig. 2 is a diagrammatic side elevation.
Fig. 3 is an elevation of certain instruments with which the aeroplane is provided, parts being broken away for the sake of clearness.
Fig. 10 is a diagrammatic view of a wireless transmission apparatus which may be employed.

In Figs. 1 and 2 are shown a ship 1 provided with a gun and a target 2. The ship is located at a considerable distance from the target, say 30,000 to 50,000 yards, and is preferably protected by a smoke screen 3 located between the ship and the target. Above the ship and the target, at a height sufficient to observe them both at all times, is an aircraft, such as an aeroplane 4, which continually flies back and forth in a path transverse to the line connecting said ship and target. The aeroplane need not be actually between the ship and target, but this, of course, is its preferred position. As the aeroplane flies back and forth, the angle X, included between the line connecting the ship and aeroplane and the line connecting the aeroplane and target, is repeatedly and constantly observed. It is evident that, if the distances from the aeroplane to the ship and from the aeroplane to the target be known, as well as the angle X, the distance from the ship directly to the target can be readily found. Line 4—4″ represents a line from the aeroplane 4 to the horizon.

Figures 4, 5, 6, 7:
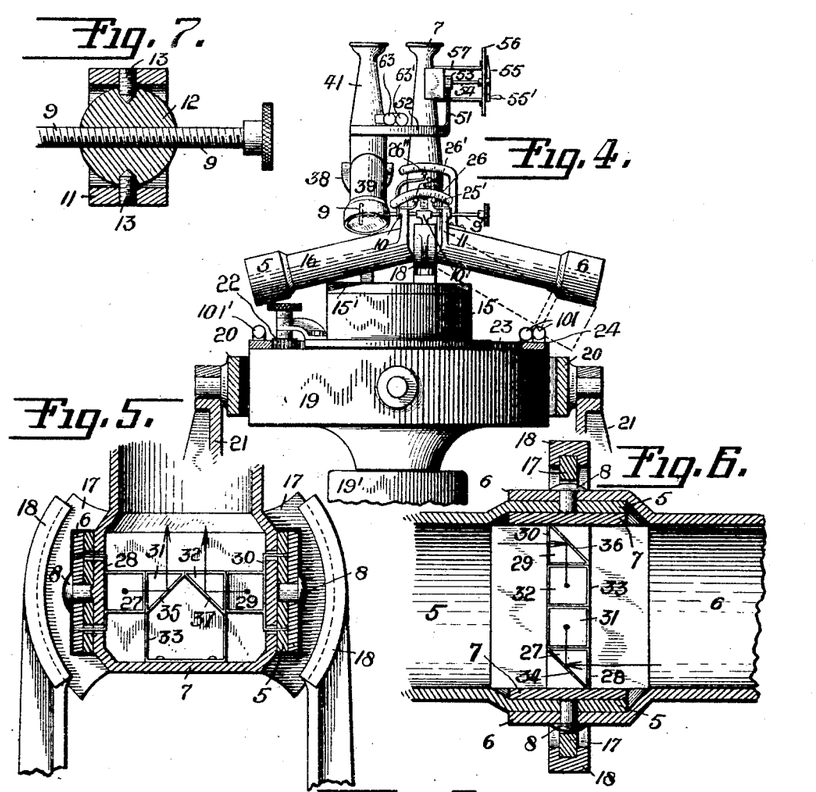
Fig. 4 is a side elevation of the apparatus shown in Fig. 3.
Fig. 5 is a vertical sectional detail view.
Fig. 6 is a horizontal sectional view of the details shown in Fig. 5.
Figs. 7, 8, and 9 are views of details.

One form of means for obtaining the angle X is shown in Figs. 3 and 4. In these figures, 5 and 6 designate suitable sighting tubes provided with a common eye-piece 7. Tube 5 may be used to sight a gun on the ship and tube 6 the target or vice versa and, in order to allow movement of tube 6 independently of tube 5 so that one may follow movements of the target and the other the ship, tubes 5 and 6 may be connected together by pivots 8 extending from eye-piece 7. Any suitable means may be provided for moving the tubes about pivots 8. I have shown hand screws 9 and 9′ passing through lugs 10 and 11 extending from tubes 5 and 6 respectively and extending into a lug 10′ on eye-piece 7. Said hand screw 9′ passes through a threaded hole in a ball 12, mounted to turn about horizontal pivots 13, 13 in lug 11 and a pivoted ball may also be provided in lug 10 to receive screw 9. If desired, the ends of screws 9 and 9' may be received in pivoted balls in lug 10'. Thus tube 5 can turn freely about its pivots 8 when hand screw 9 is turned and tube 6 when screw 9' is turned. For turning tubes 5 and 6 together screws 9 and 9' may be turned simultaneously. Tubes 5, 6, and 7 are preferably mounted on an upper base 15', which is suitably mounted upon lower base 15.

The tubes 5, 6, and 7 constitute a uniplanar structure and should also be mounted to turn about a horizontal axis in said plane and at right angles to the axis of pivots 8, 8 in order that, as the aeroplane flies on its path transverse to the line connecting the ship and target, the tubes 5 and 6 can still be sighted on said ship and target. To this end I have shown the tube 7 provided with sectors 17, 17 engaging in arc shaped grooves in standards 18, 18 mounted on base 15. Said sectors 17, 17 are, of course, suitably slotted to provide for turning of tubes 5 and 6 about pivots 8, 8.

In order to minimize the effect of the oscillations of the aeroplane upon the base 15 and the instruments mounted thereon, and to furnish a stable base line, said base 15 is mounted as by the casing 19 of a gyroscopic pendulum, the rotor of which is inside said casing and rotatable about a vertical axis. Said gyroscope casing is rendered pendulous as by means of a weight 19' and is pivotally mounted in ring 20, which in turn is pivotally mounted in standards 21 carried by the aeroplane.

Base 15 is turnable about a vertical axis on casing 19 by means of a manually turnable pinion 22 connected to base 15 and meshing with an internal gear 23 provided on ring 24 mounted on casing 19.

Various means may be provided for indicating the angle between the longitudinal axes of tubes 5 and 6. For example, pointers 25 and 25' may be mounted on lugs 10 and 11 of tubes 5 and 6 respectively and cooperate with a scale 26 mounted on tube 7 and suitably graduated so that the angle which each tube 5 and 6 makes with the vertical can be determined and the total angle between tubes 5 and 6 thus found. If desired, an additional scale 26' may be mounted to turn with tube 6 and a cooperating pointer 26'' on tube 5, as shown in Fig. 4, so that the angle between tubes 5 and 6, can be read directly. The scales may, of course, each have a vernier or other fine reading device.

By means of a suitable arrangement of optical prisms an observer stationed at the eye-piece 7 may be enabled to see through both tubes 5 and 6 at once, and hence to observe both the ship and the target at the same time. Furthermore, since tubes 5 and 6 may be turned with relation to eye-piece 7, the arrangement should be such that light entering each tube 5 and 6 will be reflected vertically upward into eye-piece 7 regardless of the angular positions of tubes 5 and 6. One means of accomplishing this is shown in Figs. 5 and 6.

In Figs. 5 and 6 is shown a prism 27, attached, as by a bracket 28, to tube 6 and a prism 29, attached, as by bracket 20, to tube 5. Between prisms 27 and 29 are two prisms 31 and 32 held as by means of a bracket 33 fast with eye-piece 7. Obviously a ray of light entering through tube 6 is reflected from face 34 of prism 27 to face 35 of prism 31, and thence upwardly into the eye-piece 7. Likewise a beam of light entering through eye-piece 5 is reflected from face 26 of prism 29 to face 37 of prism 32 and thence upwardly into eye-piece 7. Furthermore, since said prisms are arranged along the axis of pivots 8, 8 as shown in Fig. 6, the light entering through tubes 5 and 6 will be reflected vertically upward into eye-piece 7 regardless of the amount of rotation of tubes 5 and 6 about said axis.

Sighting or objective tubes 39 and 40, and eye-piece 41, are pivoted together and may be supported in bearings in pedestal 38 attached to base 15. The tubes 39 and 40 and eye-piece 41 may be provided with the same system of prisms as tubes 5 and 6 and eye-piece 7, so that an observer stationed at eye-piece 41 may see through both tubes 39 and 40 at the same time. Said tubes 39 and 40 are used to sight the horizon and are consequently provided with means for turning them evenly and simultaneously in opposite directions. In Fig. 3 I have shown, for this purpose, a hand screw 42 having oppositely threaded portions passing through pivoted nuts in lugs 43 and 44 projecting from tubes 39 and 40 respectively. Intermediate its oppositely threaded portions said screw is turnably mounted in a bearing 45 attached to eye-piece 41, while at opposite ends the screw 42 is provided with heads 46 so that it may be turned from either end.

In order to turn tubes 39 and 40 and eye-piece 41 together I have shown a hand screw 47 pivoted at its lower end to base 15 and provided with a threaded portion which passes through a pivoted nut in casing 48 attached to tube 40.

Attached to tube 39 and movable therewith is a scale 50 with which cooperates a pointer 49 perpendicular to and movable with tube 40. In this manner the angle which each tube 39 and 40 makes with the horizontal, in other words the "dip" angle, can be readily determined. A second scale 50' is mounted fixedly to pedestal 38 beneath scale 50 and cooperates with pointers 39' and 40' attached to tubes 39 and 40 respectively. The purpose of this scale will be explained later. The zero point of scale 50′ is preferably at the center of said scale so that the angle made by each tube 39 and 40 with the vertical can be determined.

A scale 51, preferably attached by means of arms 52 to eye-piece 41 is provided on its upper edge with gear teeth. A gear wheel 53, rotatably supported by eye-piece 7 meshes with the aforesaid gear teeth and may be turned thereby when eye-piece 7 is moved. Rotatable with gear wheel 53 is a shaft 54 which carries on its end a pointer 55, which cooperates with a dial 56 supported by brackets 57 from eye-piece 7. Cooperating with scale 51 is a pointer 58 movable with eye-piece 7. The zero point on scale 51 is located at the center of said scale and said scale may be graduated in degrees, while dial 56 may be provided with a zero point 59 and graduated in fractions of degrees, in order that the angle which eye-piece 7 makes with the vertical may be accurately determined. Pointer 55 is preferably provided with a handle 55′ at one end for rotating gear 53 when desired and thereby moving eye-piece 7 and sighting tubes 5 and 6.

It will be seen that, when pointer 58 registers with the zero point 60 on scale 51, eye-piece 7 will be vertical, provided that said zero point is in the true vertical. The tubes 5 and 6 and eye-piece 7 will then be in the same vertical plane as the points on the ship and target which are being sighted. In other words, at this instant of time the aeroplane will be practically in the same vertical plane as the gun and target, so that the bearing or position in azimuth of the target with respect to the ship is given by the observed position of the aeroplane from the ship at this instant. The registration of pointer 58 with its zero point should be communicated instantly to the ship so that the ship may have the true azimuth of the target which is put on to the fire control system and carried by the gyro compass for use for correct firing. While various means may be provided for such communication, means may be arranged whereby a wireless signal is automatically given whenever pointer 58 registers with the zero point 60 on scale 51. I have shown such a means in Fig. 9, wherein the tip of pointer 58 contacts with the tip of an insulated contact strip 61 whenever pointer 58 registers with zero point 60, thereby closing a circuit through a wireless transmission apparatus with which the ship is in communication. Pointer 58 should, of course, be insulated as at 62 from eye-piece 7. Of course any conventional type of wireless transmission apparatus could be used, preferably the one used for wireless telephone or equivalent communication with the ship. I have indicated one form of such apparatus diagrammatically in Fig. 10, wherein 71 designates an antenna, 72 a tuning coil, 73 a condenser, 74 a spark gap, 75 a transformer, and 76 a generator. Upon the contacting of pointer 58 with contact strip 61, a circuit is closed through relay coil 79, whereupon relay armature 77 will be attached to engage point 78 and wireless impulses will be sent from antenna 71 in the well known manner. If desired the closing of the aforesaid circuit could ignite a powder charge or otherwise cause a puff of smoke which could readily be seen at the ship or any other visual signal could be used.

In order that the aeroplane may be in substantially the same vertical plane as the gun and target when pointer 58 registers with zero point 60, it is, of course, essential that said zero point be maintained in the true vertical. While the gyroscopic pendulum will not be subject to sudden oscillations, I prefer to provide other or additional means for this purpose. The aeroplane being made to fly at some continuous level, eye-piece 41 and tubes 39 and 40 may be moved through hand screws 47 and 42 until the cross-hairs of tubes 39 and 40 cut the two horizons. Since tubes 39 and 40 can move only through equal angles with relation to the vertical it is evident that when the cross-hairs of said tubes cut the two horizons, eye-piece 41 is vertical. Consequently the zero point on scale 51, which is carried by the eye-piece will be vertical, since it equally divides the angle included between tubes 39 and 40.

The true vertical may also be obtained in case one horizon is obscured by utilizing the height of the aeroplane above the earth as obtained for instance from the reading of a micro-aneroid barometer. From this reading the dip angle, that is the angle between the horizontal and the line of sight to the horizon, may be obtained by means of a dip table. The tube 39 or 40 toward the invisible horizon may then be set at the correct angle as obtained from the dip table by turning hand screw 47 in one direction or the other, until the correct dip angle is indicated on scale 50′ by either pointer 39′ or 40′, while the other tube is sighted on the visible horizon. Since the turning of hand screw 47 moves both tubes 39 and 40 as well as eye-piece 41 simultaneously, it will be seen that when the current dip angle is indicated on scale 50′ and one horizon is visible, the eye-piece 7 and consequently the zero point on scale 51 will be in the true vertical.

Still another method of maintaining said zero point vertical is by means of a level, preferably a highly damped level reading in minutes or half minutes of arc. Such a level is shown at 63 mounted on eye-piece 41 and is found to be operative and highly serviceable when stabilized as by the gyro 19. Obviously when said level indicates that it is exactly horizontal, eye-piece 41, and hence the zero point on scale 51, is exactly vertical. If desired, another level 63' similar to level 63 but differing therefrom in sensitiveness may be mounted on eye-piece 41 adjacent level 63.

The vertical position of the zero point on scale 51 may also be checked, after the tubes 39 and 40 have been sighted on the horizon, by referring to the dip table to see if half the angle indicated by pointer 49 on scale 50 corresponds to the correct height as ascertained by the aneroid.

It is evident that the above methods for obtaining the vertical may be used as cross checks on each other, thereby insuring an accurate determination of the vertical, so essential to the obtaining of the target bearings.

Figure 14:
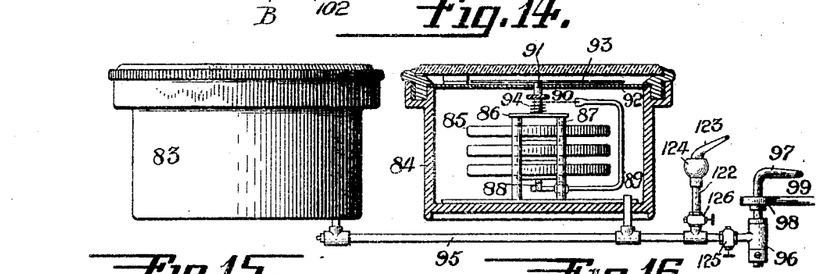
Fig. 14 is a view of an arrangement of certain aneroid barometers, one of the barometers being shown in section.

For obtaining accurately the height of the aeroplane above the earth I may use a micro-aneroid barometer. Preferably a plurality of such barometers of differing sensitiveness, should be used. In Fig. 14 I have shown two micro-aneroid barometers 83 and 84, the instruments being of any suitable conventional design and differing in sensitiveness.

One form of construction which the barometers may assume is shown in connection with barometer 84 in Fig. 14. An elastic container 85 having a yielding wall and exhausted of air is hung on a cross-piece 86 supported by and fastened to posts 87 which in turn are rigidly secured to the bottom of the casing. The under side of the container is provided with a link 88 which is movably connected with a rocking arm 89. The opposite end of the rocking arm is provided with a cord 90, one end of which is secured at a point on an indicator spindle 91. Said spindle projects above a suitably graduated dial 92 and is provided with an indicator or pointer 93 affixed to such projecting end. The needle is thereby moved over the face of the dial as the spindle is rotated. A hair spring 94 is applied to the spindle to hold the same in position and the cord taut, thus retaining the needle normally in one position as at zero.

In order that the height of the aeroplane may be indicated accurately, some means should be provided for supplying to the barometers the mean of the atmospheric pressure adjacent the barometers. For this purpose I have shown the interior of the casing of each barometer connected through a pipe 95 with a suitable receptacle 96 in which is rotatably mounted a tube or explorer 97 open at one end to the atmosphere. For continuously rotating the explorer, a pulley 98 may be attached thereto and connected by a belt 99 with any suitable power source. The aeroplane should preferably also be provided with a compass of any suitable type, such as a gyro compass, not shown.

As the explorer 97 rotates, the barometric indicators 93 will oscillate ordinarily about a certain mean value. Accordingly I prefer to provide an auxiliary means which may be moved to a position in which the mean value of the atmospheric pressure will be supplied more steadily to the barometers. By way of example, a pipe 122 may be connected at one end to pipe 95 and may carry at its other end a universally mounted tube 123, said tube being connected with pipe 95 as through a ball and socket joint 124. By noting the variations of the readings of the barometers while explorer 97 is in rotation, tube 123 may be moved to a position in which the mean of the pressure will be supplied to said barometers, and communication with the explorer may then be cut off by turning valve 125. An additional valve 126 may be provided between pipes 95 and 122.

To obtain the range between the target and the ship, the range between the aeroplane and target 4—2 is taken continuously by a conventional range finder and spotting glass as the aeroplane flies back and forth, and this range, together with the included angle X, is constantly telephoned by wireless to the ship. The ship, meanwhile, is constantly taking the range 1—4 of the aeroplane. In this manner the ship is constantly supplied with two sides of the triangle 1, 2, 4, together with their included angle X, from which the base line of the triangle 1—2, which is the approximate range between the target and ship, can be readily obtained.

Since the aeroplane is flying preferably at a continuous level it is evident that the angle X will vary as the aeroplane flies along its path, and will be a maximum when the aeroplane is in the same vertical plane as the gun on the ship and the target. Also, when the aeroplane is in said position the sum of the ranges between the ship and aeroplane and the aeroplane and target is a minimum. In this way two checks on the correct azimuth position or bearing of the target are given.

Figures 8, 9, 11:
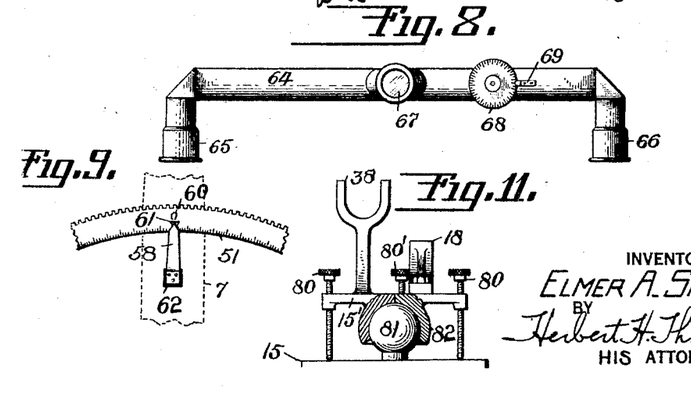
Fig. 11 is a detail view of a modification.

In Fig. 3 I have shown in dotted lines a range finder 64 which may be mounted in any suitable manner on base 15. This range finder may be of any conventional type, as shown in Fig. 8, wherein 65 and 66 designate sighting extensions and 67 an eye-piece. 68 is a dial cooperating with a pointer 69 for setting the instrument for different ranges. Since the specific type of range finder does not form part of my invention, detailed description thereof is thought unnecessary.

Preferably the aeroplane is provided with a plurality of turn indicators of differing sensitiveness for indicating accurately the course of the aeroplane and enabling the aviator to keep on as straight a course as possible. These turn indicators may be of any suitable conventional construction and are hence not shown.

The sighting instruments may be mounted so that they can be tilted together with reference to lower base 15, as by interposing a suitable pivotal connection between upper base 15' and lower base 15. By way of example, in Fig. 11 I have shown a ball 81 attached to base 15 and cooperating with a socket 82 attached to base 15'. Screws 80 and 80' may be provided for tilting base 15' about axes at right angles to each other.

Figure 13:
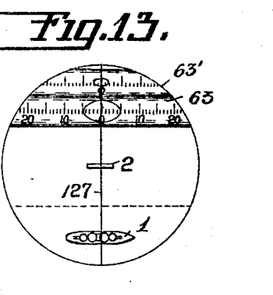
Fig. 13 is a view of the field of vision of the observer looking through one of the instruments.

In Fig. 13 I have shown the field of vision of the person sighting the ship and target through eye-piece 7. The ship 1 and target 2 are seen with one eye through tubes 5, 6, and 7. At the same time the levels 63 and 63' on tube 41 can be seen by the other eye and appears within the field of vision of the sighter, as shown. 127 denotes a suitable cross-hair.

Figure 12:
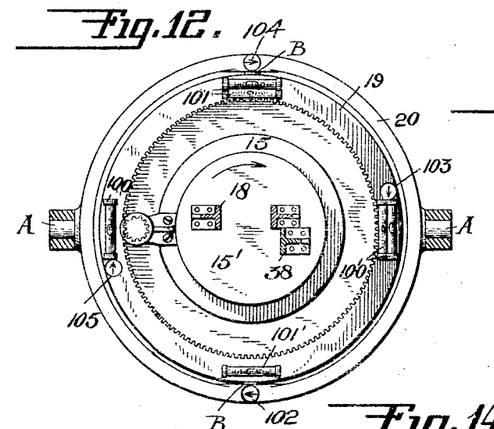
Fig. 12 is a plan view of the instrument supporting base, the instruments being removed.

If desired, the base on which the sighting instruments are mounted may be provided with means for indicating its position about either of horizontal axes A—A and B—B (Fig. 12). Thus, as shown in Fig. 12, on base 19 are mounted a pair of levels 100' having different damping characteristics for indicating with a high degree of accuracy the displacement of said base about axis A—A. If desired another similar level 100 may be mounted at the opposite side of the gyro base. Another set of similar levels 101, 101' at right angles to levels 100, 100' serve to indicate the displacement of the base about horizontal axis B—B. Preferably, these levels are highly damped and of different sensitiveness.

For aiding in turning base 19 about either horizontal axis I have shown means for indicating the direction in which said base will precess when pressure is applied at a certain point or points. Such means may take the form of arrows 102, 103, 104, 105, each of which indicates the direction in which the top or base 19 will precess when pressure is applied adjacent the arrow. Thus, if pressure is applied at arrow 102, tending to turn base 19 about axis A—A, said base will precess in a counter-clockwise direction about axis B—B as indicated by said arrow. Similarly, if pressure be applied at arrow 104, base 19 will precess about axis B—B in a clockwise direction.

If desired, means may be provided for damping oscillations of the gyro stabilized base 19 about axis B—B. I have shown one form of such means in Figs. 15 and 16. As has been previously stated, base 19 comprises a casing inside of which is mounted a gyro rotor for turning about a vertical axis. Extending downwardly from said casing is a pipe 106 having at its lower end two nozzles 107, 108. Air is thus forced from casing 19 by the centrifugal action of the gyro rotor through pipe 106 and nozzles 107, 108. Normally the air jets from said nozzles produce equal but opposite reactions. A pendulum 109 rotatably suspended from weight 19' by arms 110, 111 is provided with two closing members 112, 113. If the base 19 oscillates to the right (Fig. 15) the member 113 closes nozzle 107 and a reaction pressure arises which produces a turning moment about an axis at right angles to axis B. If the oscillation of base 19 is in the opposite direction, member 112 closes nozzle 108 and the turning moment is in the opposite direction. The damping means thus described is well understood in the art and any other suitable and conventional damping means may obviously be utilized.

Figure 15:
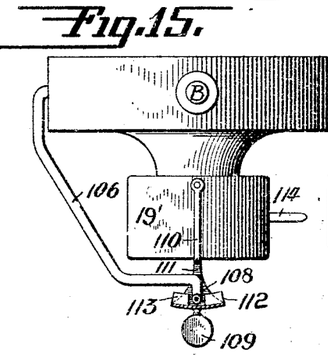
Fig. 15 is a front elevation of an instrument supporting base provided with certain damping and locking means.
Figure 16:
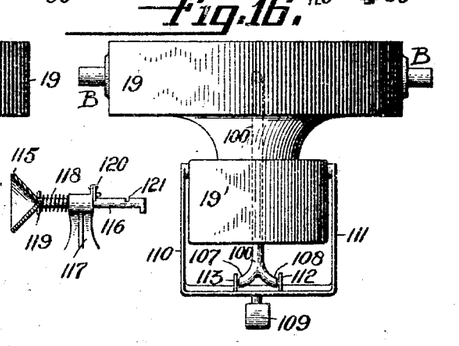
Fig. 16 is a side elevation of the structure shown in Fig. 15.

To lock the gyro casing 19 to the aeroplane whenever desired I may use the structure shown in Fig. 15. Extending from weight 19' is a finger or projection 114, adapted to be received within conical member 115. The latter may be attached to a rod 116 slidably mounted in a bracket 117. A spring 118, between bracket 117 and a collar 119 on rod 116 normally tends to move member 115 into engagement with finger 114. It will thus readily be seen that, when finger 114 is fully engaged with the portion at the apex of member 115, movement of casing 19 and weight 19' in all directions is prevented. Movement of casing 19 to the left about axis B—B cannot occur under such conditions since the interior surface of conical member 115 is off center with respect to axis B—B and any tendency of casing 19 to move in such direction would tend to move finger 114 through the bottom of member 115. To unlock the gyro-casing member 115 and rod 116 may be withdrawn against the action of spring 118 and locked in position as shown in Fig. 15 by means of a pivoted latch 120 engageable with a notch in rod 116. If desired, another notch 121 may be provided in rod 116 for engagement by latch 120 when member 115 is in locking engagement with finger 114. Due to the cone-shaped interior of member 115 it will be seen that finger 114 can be engaged by said member even though base 119 has been tilted from its original position, and that said base can thus be restored to its original position and locked therein.

The mode of operation of my invention will be readily understood from the foregoing. As the aeroplane flies at a substantially continuous level the zero point of scale 51 is kept vertical by any of the means above set forth and is checked from time to time as indicated above. Meanwhile, the observer on the aeroplane keeps sighting tubes 5 and 6 directed on the gun and target, and the readings of the angle included between said tubes are constantly communicated by wireless to the ship, as are also the readings of the range between the aeroplane and target. As the aeroplane flies along its path as shown, the tubes 5 and 6 must be moved to keep the gun and target in sight, and gear 53 will move along the top of scale 51 and the angle which eye-piece 7 makes with the vertical may be obtained. Finally, when eye-piece 7 is exactly vertical, pointer 58 and contact strip 61 will engage, whereby a wireless or other signal will be automatically communicated to the ship and the true azimuth position of the target is thereby given. Of course, the aforementioned signal could be given manually if desired. Also, from time to time the position of the eye-piece 7 along the scale 51 may be communicated to the ship. As before stated, the azimuth position of the target may be checked by noting when the angle X becomes a maximum and the sum of the ranges between the ship and aeroplane and the aeroplane and target a minimum. It will thus be seen that the fire control system which I have devised affords ready and accurate means for determining the range and bearing of a distant target.

If desired, the range between the ship and target may be ascertained by an alternative method without the use of a range-finder. Thus, the height of the aeroplane above the earth may be determined by suitable means, such as a micro-aneroid barometer, or by a plurality of such barometers of different sensitiveness. The distance 4—4' (Fig. 2) is thus obtained. If, now, the angle 4'—4—2, which the tube sighted on the target makes with line 4—4' be measured, distance 4'—2 can be readily determined since angle 4—4'—2 is a right angle and thus one side and two adjacent angles of triangle 4—4'—2 are known. Likewise, if angle 1—4—4', which the tube which is sighted on the ship makes with line 4—4' be known, distance 1—4' can be determined. The total distance 1—2 can then be found when the aeroplane is in line with the ship and target, by adding together distances 4'—2 and 1—4'. By means of pointers 25 and 25' and scale 26 the angle which each tube 5 and 6 makes with line 4—4' can be read, and the readings of such angles and of the distance 4—4' should be communicated to the ship so that, when eye-piece 7 is exactly vertical, as will be indicated by the signal resulting when pointer 58 registers with the zero point on scale 51, distances 4'—2 and 1—4' can be quickly determined and added together to find the range 1—2.

Since the sighting instrument comprising tubes 5 and 6 and eye-piece 7 is used to measure angles it can be accurately termed a transit instrument, and the same is true of the sighting instrument comprising tubes 39 and 40 and eye-piece 41. Furthermore, since the tubes and eye-piece of each transit instrument are in a common plane, each instrument may be termed uniplanar. It is also evident that, since the effect of shots on the target can be observed through eye-piece 7, the instrument comprising tubes 5 and 6 and eye-piece 7 may also be used as a spotter's glass.

In accordance with the provisions of the patent statutes I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having thus described my invention, what I claim as new and desire to secure by Letters Patent is:

1. In a fire control system, a movable reference member, a transit instrument movable with relation to said member, and means comprising a gyroscope and a level for maintaining a point on said member in a predetermined relation to the vertical.

2. In a fire control system, a movable reference member, a transit instrument movable along said member, and means comprising a second transit instrument for maintaining a point on said member in a predetermined relation to the vertical.

3. In a fire control system, a movable reference member, a transit instrument movable along said member, and means comprising a level and a second transit instrument on which said level is mounted, for maintaining a point on said member in a predetermined relation to the vertical.

4. In a system for ascertaining the range of an object with relation to a distant point, an aircraft, means on said aircraft for sighting said point and object, and means for indicating the angle between the lines of sight from the first named means to said point and object respectively.

5. In a system for ascertaining the bearing of an object with relation to a distant point, an aircraft, means on said aircraft for determining when said aircraft is in substantially the same vertical plane as said object and point, and signalling means operatively connected to said first named means whereby a signal may be transmitted at such time.

6. In a system for ascertaining the bearing of an object with relation to a distant point, an aircraft, a transit instrument thereon having means for simultaneously sighting said object and said point, and means for determining when said transit instrument is in substantially the same vertical plane as said object and point.

7. In a system for ascertaining the range and bearing of a target with relation to a distant point, an aircraft, means on said aircraft for sighting said point and target, means for determining when said aircraft is in substantially the same vertical plane as said object and point and means for measuring the angle between the lines of sight from the first named means to said point and said target, when said aircraft passes through said vertical plane.

8. In a fire control system, the combination with an aircraft, of a transit instrument mounted thereon, means for adjusting said instrument in a vertical plane, a reference member with which said instrument cooperates, and means for maintaining said member in a predetermined relation to the vertical.

9. In a fire control system as claimed in claim 8, means for minimizing the effect of the oscillations of said aircraft upon said instrument.

10. In a system for ascertaining the range and bearing of a target with relation to a distant point, an aircraft, means on said aircraft for sighting said point and target, and for measuring the angle between the lines of sight to said point and said target, means for determining when said aircraft is in substantially the same vertical plane as said target and point and signalling means actuated by said determining means whereby the vertical angles subtended by the point and target may be read simultaneously at the time the aircraft passes through said vertical plane.

11. In a fire control system, the combination with an aircraft, of a transit instrument mounted thereon, means for adjusting said transit instrument in a vertical plane, a second transit instrument adjustable in a vertical plane, and a reference member carried by said second transit instrument with which the first mentioned transit instrument cooperates.

12. In a fire control system as claimed in claim 11, a swiveled mount for said instruments, and means for stabilizing said mount.

13. In a system for ascertaining the range and bearing of a target with relation to a distant gun, a transit instrument movable in a vertical plane for simultaneously sighting said target and gun, means for measuring the angle between the lines of sight to said target and gun respectively, a graduated member and a cooperating index member, one of said members being on said instrument, and means for maintaining a point on one of said members in a predetermined relation to the vertical.

14. In a system for ascertaining the range and bearing of a target with relation to a distant gun, an aircraft, a transit instrument mounted thereon, and movable in a vertical plane, a graduated member and a cooperating index member, one of said members being on said instrument, and means for maintaining a point on one of said members in a predetermined relation to the vertical.

15. In a system of the type described, a transit instrument movable in a vertical plane, a reference member with which said instrument cooperates, a movable support for said instrument and reference member, and means for maintaining a point on said reference member in a predetermined relation to the vertical.

16. In a system for controlling gun fire from a distance, an instrument adapted to be located at an intermediate point between a gun and a target for simultaneously sighting on the gun and the target and movable across the line of fire or its projection, and means for signaling the true transit position to the gun.

17. In a fire control system, an instrument for enabling an observer to simultaneously sight a ship and a target when positioned between said ship and said target, and a level located within the field of vision of said observer when sighting said ship and target.

18. In a system for ascertaining the range or bearing of an object with relation to a distant point, the combination with an aircraft, of a sighting instrument adapted to be mounted thereon comprising a plurality of sighting tubes, a support for said instrument, means for adjusting one of said tubes with relation to the other, and means for adjusting said instrument with relation to said support.

19. In a system for ascertaining the range or bearing of an object with relation to a distant point, the combination with an aircraft, of a sighting instrument adapted to be mounted thereon comprising an eye-piece and a plurality of movable sighting tubes, and means for measuring the angle included between said sighting tubes.

20. In a system for ascertaining the bearing of an object with relation to a distant point, an aircraft, a transit instrument thereon having means for simultaneously sighting said object and said point, and means on said instrument whereby the true vertical may be ascertained.

21. In a system for ascertaining the bearing of an object with relation to a distant point, an aircraft, a gyroscope thereon, a transit instrument having means for simultaneously sighting said object and said point and stabilized by said gyroscope, and means for determining when said transit instrument is in substantially the same vertical plane as said object and point.

22. In a system for ascertaining the range of an object with relation to a distant point, an aircraft, means on said aircraft for sighting said point and object, means for stabilizing said sighting means, and means for indicating the angle between the lines of sight to said point and object respectively.

23. In a system for ascertaining the range of an object with relation to a distant point, an aircraft, means on said aircraft for sighting said point and object, means whereby the true vertical may be ascertained as a reference, and means for indicating the angle between the lines of sight to said point and object respectively.

In testimony whereof I have affixed my signature.

ELMER A. SPERRY.